(12) United States Patent
Forjahn (10) Patent No.: US 6,374,160 B1
(45) Date of Patent: Apr. 16, 2002

(54) METHOD AND DEVICE FOR MONITORING FLUID CONSUMPTION

(75) Inventor: Walter Forjahn, Bochum (DE)

(73) Assignee: Rexam AB, Malmo (SE)

( * ) Notice: Subject to any disclaimer, the term of this patent is extended or adjusted under 35 U.S.C. 154(b) by 0 days.

(21) Appl. No.: 09/270,821

(22) Filed: Mar. 18, 1999

(51) Int. Cl.⁷ .......................... G05D 7/00; G06F 19/00; B05D 5/00
(52) U.S. Cl. ....................... 700/283; 700/240; 700/281; 700/306; 118/682; 118/690; 239/68; 239/75; 427/8; 702/55
(58) Field of Search .............................. 700/281, 282, 700/283, 306, 236, 240; 702/55; 118/682, 684, 690, 693, 694; 427/8; 239/68, 74, 75

(56) References Cited

U.S. PATENT DOCUMENTS

| | | | |
|---|---|---|---|
| 4,370,943 A | | 2/1983 | Watanabe .................... 118/218 |
| 5,035,200 A | * | 7/1991 | Moriyama et al. .......... 118/693 |
| 5,335,185 A | * | 8/1994 | Pitts et al. ................... 700/282 |
| 5,433,587 A | * | 7/1995 | Bankert et al. ............. 417/44.2 |
| 5,481,260 A | | 1/1996 | Buckler et al. ........ 340/870.09 |
| 5,519,638 A | * | 5/1996 | Tiao ............................ 700/281 |
| 5,564,305 A | | 10/1996 | Cadeo ....................... 73/304 R |
| 5,583,790 A | * | 12/1996 | Lan et al. .................... 700/282 |
| 5,687,098 A | * | 11/1997 | Grumstrup et al. ......... 700/282 |
| 5,713,403 A | * | 2/1998 | Clusserath et al. ......... 141/101 |
| 5,975,747 A | * | 11/1999 | Flaherty ...................... 700/240 |
| 5,995,909 A | * | 11/1999 | Bretmersky et al. .......... 702/50 |

FOREIGN PATENT DOCUMENTS

| | | |
|---|---|---|
| DE | 39 25 016 A1 | 1/1991 |
| DE | 43 44 701 A1 | 9/1995 |
| EP | 0 119 057 | 9/1984 |
| EP | 0 732 151 A2 | 9/1996 |
| JP | 60-122320 | 6/1985 |
| WO | 95/33574 | 12/1995 |

\* cited by examiner

Primary Examiner—William Grant
Assistant Examiner—Paul Rodriguez
(74) Attorney, Agent, or Firm—Pillsbury Winthrop LLP (57) ABSTRACT

A method and device are disclosed for monitoring lacquer consumption per can in a lacquer application unit. The device includes a counter providing can number data on the number of cans being applied with lacquer in the application unit; a tank for intermediate storage of lacquer; a lacquer feeder for feeding lacquer from a lacquer reservoir to the tank through an inlet pipe; and a lacquer feeder for feeding lacquer from the tank to the application unit. A valve is provided in the inlet pipe for intermittent movement between a closed position and an open position, in which lacquer is admitted into the tank. A flow meter is arranged to provide flow rate data on the amount of lacquer flowing into the tank. The device also includes a processor that, based on the flow rate data and the can number data, over a time period between two subsequent movements of the valve to one and only one of the positions, effects a calculation of the total amount of lacquer passing the flow meter during the time period and the total number of lacquer coated cans during the time period, to subsequently, by dividing the total amount by the total number, calculate a lacquer consumption value per can.

41 Claims, 5 Drawing Sheets

METHOD AND DEVICE FOR MONITORING FLUID CONSUMPTION

TECHNICAL FIELD

The invention relates to monitoring devices and more particularly, to methods and devices for monitoring the amount of fluid being applied to items in a fluid application unit. Specifically, said methods and devices are devised for use in a can production apparatus, for monitoring the amount of liquid lacquer applied to the outside of cans.

BACKGROUND OF THE INVENTION

In an apparatus for production of cans, such as beverage cans of aluminum or steel material, a printer unit provides a graphical print on the circumferential surface area of cylindrical cans fed thereto. In some cases, the printer unit is preceded by a lacquer application unit, in which the cans are first provided with a so-called base-coat and then dried in an oven. This base-coat is a white lacquer that is applied in order to cover the outer metal surface of the can. The lacquer is fed from a lacquer reservoir to the lacquer application unit, in which the lacquer first is transferred to a rotating gravure roller. The gravure roller is abuttingly arranged against the periphery of a correspondingly rotating application roller to evenly transfer lacquer thereto. A can is fed to the application unit and is applied against the periphery of the application roller, so that a film of wet lacquer is transferred onto the surface area of the rotating can. It is also conceivable to arrange a similar lacquer application unit after the printer unit, in order to apply transparent lacquer, so-called over-varnish, to the graphical print on the can. In this case, the under-lying base-coat layer might be omitted. It is also conceivable to apply a transparent lacquer, so-called size-coat, directly to the metal surface of the can, which after drying is fed to the printer unit. In general, the graphical print on such a size-coat layer is not covered by over-varnish.

Traditionally, the lacquer application process is monitored by an operator taking out random samples of the lacquer-coated cans when these have been subsequently dried in the oven. Typically, two cans per shift for each apparatus are analyzed with respect to their dry lacquer film weight. Such an analysis is time-consuming and could last for up to 30 minutes. Evidently, errors in the production apparatus might not be discovered at all by this analysis, or at least not in due time. If excessive amounts of base-coat is applied to the cans, the subsequent graphical print will be unable to completely cover the thick white base-coat and the cans will assume a gray tint. Such gray cans must be discarded, leading to increased production costs. Excessive amounts of lacquer could also lead to unwanted deposition of lacquer on the inside of the cans. Since the can production apparatus for economical reasons cannot be shut down during the analysis, a large amount of defect cans will be produced in case of errors. Typically, the production rate in such an apparatus is 1,000–2,200 cans per minute. Since errors are not discovered in time, there is also a risk for failure in the equipment, leading to high cleaning/down-time costs for the application unit or the printer unit. Excessive amounts of lacquer could result in cans not being fully dried after the oven. Such cans must be discarded. Further, when cans are being processed in a subsequent necking unit, wrinkles might be formed in the neck area of the can if too much base-coat or over-varnish has been applied thereto. On the other hand, too small amounts of lacquer on the cans might lead to aluminum pick-up in subsequent equipment, e.g. the necking unit.

Obviously, there is a need for continuous monitoring of the amount of lacquer applied to each can, at least on an average basis.

In other technical fields, devices for consumption monitoring are previously known. An apparatus for application of adhesive on veneers is disclosed in Japanese patent publication No. 60-122320. In that apparatus, an intermediate storage tank is arranged between a reservoir for adhesive and a fluid dispenser. A non-contacting level gauge is provided at the tank to measure the height of the liquid level of adhesive in the tank. A counter is arranged to measure the number of adhesive coated veneers passed through said fluid dispenser while the liquid in the tank decreases between an upper and a lower level, as measured by the level gauge. A processing means is connected to the level gauge and the counter, so as to calculate the adhesive consumption per veneer.

A similar device is disclosed in German patent publication No. 39 25 016 (A), in which an apparatus for application of liquid glaze on ceramic tiles has an intermediate storage tank between a glaze reservoir and an application unit. A non-contacting level gauge is arranged to indicate an upper and a lower glaze level in the tank. During operation, the supply of glaze to the tank is interrupted and the rate at which the glaze drops from the upper to the lower level is measured and compared with a reference value for assessing the weight of glaze deposited on each article.

One drawback of the above arrangements is their inherent sensitivity to irregularities on the liquid surface in the intermediate storage tank. Often, the liquid must be continuously stirred in the tank. Such stirring will result in surface irregularities, typically in the order of 5–10 mm, creating errors when detecting the liquid at the upper or the lower levels in the tank.

These errors will be directly transferred into the calculation of the liquid consumption. The stirring could also cause foaming in the tank. By such foaming the liquid level in the tank is no longer unambiguously defined and might therefore be difficult to identify with a level gauge. Further, their sensitivity to surface variations make these arrangements less suitable for use in a can production apparatus for another reason. In a can production apparatus, a rejection sensor is arranged at the application unit to identify defect cans before they reach the application roller. When a defect can is detected and should be rejected, the whole application unit is retracted so that the defect can, and often the preceding and subsequent cans as well, passes the application roller without being coated with lacquer. A tank being connected between the application unit and the lacquer reservoir would inevitably be subjected to vibrations due to the retraction of the application unit, resulting in such measurement errors as described above.

Their sensitivity to surface variations is not the only problem of these known devices, but also that the operator is unable to distinguish accurately measured values from measured values that are influenced by surface irregularities etc.

Further, the consumption is only calculated intermittently, i.e. during time periods when the lacquer supply is shut off and the liquid level descends in the tank. Thus, fluid consumption is not monitored at all times during operation of the apparatus.

It should be noted that a can production apparatus operates at extremely high production rates, typically 1,000–2,200 cans per minute, the amount of lacquer applied to each can being small; approximately 200 mg wet base-coat per can, or approximately 150 mg wet over-varnish per can for a typical beverage can of aluminum or steel material. Deviations of more than about 15–30% are unacceptable for the reasons given by way of introduction. Thus, fluid consumption monitoring must be performed at high accuracy.

SUMMARY OF THE INVENTION

It is therefore an object of the present invention to provide a method and device for monitoring the consumption of a fluid in an application unit to obviate, or at least alleviate, the problems and limitations of the prior art systems.

It is a further object of the invention to to provide a method and device allowing an operator to identify unwanted trends in the fluid consumption, so that correcting measures can be taken at an early stage.

A yet further object of the invention is provide a method and device allowing an operator to identify incorrectly calculated consumption values.

Still another object of the invention is to provide a method and device for monitoring fluid consumption that can be installed at low cost, with only minor modification of existing production apparatus.

One further object of the invention is to provide a method and device for monitoring the consumption of fluid at all times during operation of the application unit.

Still another object of the present invention is to provide a method and device allowing the consumption of a fluid in an application unit to be monitored at high accuracy also when there is a need for continuous stirring of said fluid before it is fed to said application unit.

Another object of the invention is to provide a method and device allowing the consumption of a fluid in an application unit to be monitored at high accuracy also when said unit is subjected to vibrations.

According to the invention there is provided a method for monitoring the amount of fluid being applied to items in a fluid application unit, this unit being connected to a fluid reservoir via an intermediate storage tank, the tank having an inlet pipe connected to the reservoir and an outlet pipe connected to the application unit, and valve means being arranged in the inlet pipe for movement between a closed position and an open position. The method comprises the steps of: intermittently moving the valve means from the closed to the open position, thereby admitting fluid into the tank and raising a fluid surface therein from a lower level to an upper level; measuring an amount of fluid entering the tank by means of a flow meter arranged in connection with the inlet pipe; counting a number of items being applied with fluid in the fluid application unit; calculating a first value indicating the total amount of fluid passing the flow meter during a time period between two subsequent movements of the fluid surface to one and only one of said levels; calculating a second value indicating the total number of items being applied with fluid during said time period; and calculating a fluid consumption value per item by dividing the first value with the second value.

By this method, the amount of fluid being applied to each item is calculated as an average over said time period. By repeatedly calculating such average amounts and successively presenting them to an operator, undesired trends can be distinguished at an early stage.

The use of a flow meter allows the actual amount of fluid entering the tank to be measured at high accuracy.

Further, the consumption of fluid per item is monitored also during a filling sequence, i.e. when fluid is admitted into the tank. It is also possible to assess the accuracy of calculated fluid consumption value per item by examining the difference in the amount of fluid entering the tank from one filling sequence to the next. This difference indicates the magnitude of the surface irregularities in the tank during the measurement. Further, the method of the invention can be incorporated in present application units at low cost, with only minor modification of existing equipment. All, or at least a major part of the steps of the inventive method can be controlled by a computer program executed on a conventional computer.

According to a preferred embodiment, the inventive method also comprises the steps of sensing the position of said valve means, and defining the upper and lower levels based on a movement of the valve means to the closed and open positions, respectively. In this embodiment, both the flow of fluid into the tank and the number of coated items are calculated during a time period defined by two subsequent movements of the valve means to one and only one of its positions. This has proved to reduce the sensitivity to irregularities on the fluid surface compared to prior art devices.

According to a first aspect of the invention, the one and only one level is the lower level, and the valve means is controlled to open and close based on level signals from a level sensor associated with the tank. According to a second aspect of the invention, the one and only one level is the upper level, and the valve means is controlled to open and close based on level signals from a level sensor associated with the tank.

According to a third aspect of the invention, the one and only one level is the lower level, and the valve means is controlled to open based on a level signal from a level sensor associated with the tank and close when a predetermined amount of fluid has passed the flow meter. In the third aspect, there is no need for a level sensor to detect the upper level in the tank.

In one preferred embodiment of the invention, the calculated fluid consumption value per item is sent to a display means for graphical presentation of a succession of such values. This allows an operator to identify undesired trends in the fluid consumption, so that correcting measures can be taken at an early stage.

According to a further aspect of the invention there is provided a device for carrying out the method.

BRIEF DESCRIPTION OF THE DRAWINGS

These aspects and further objects and advantages of the present invention will become more readily apparent upon consideration of the following description taken in conjunction with the accompanying drawings, illustrating one preferred embodiment of the invention, wherein.

DETAILED DESCRIPTION OF THE INVENTION

Figure 1:
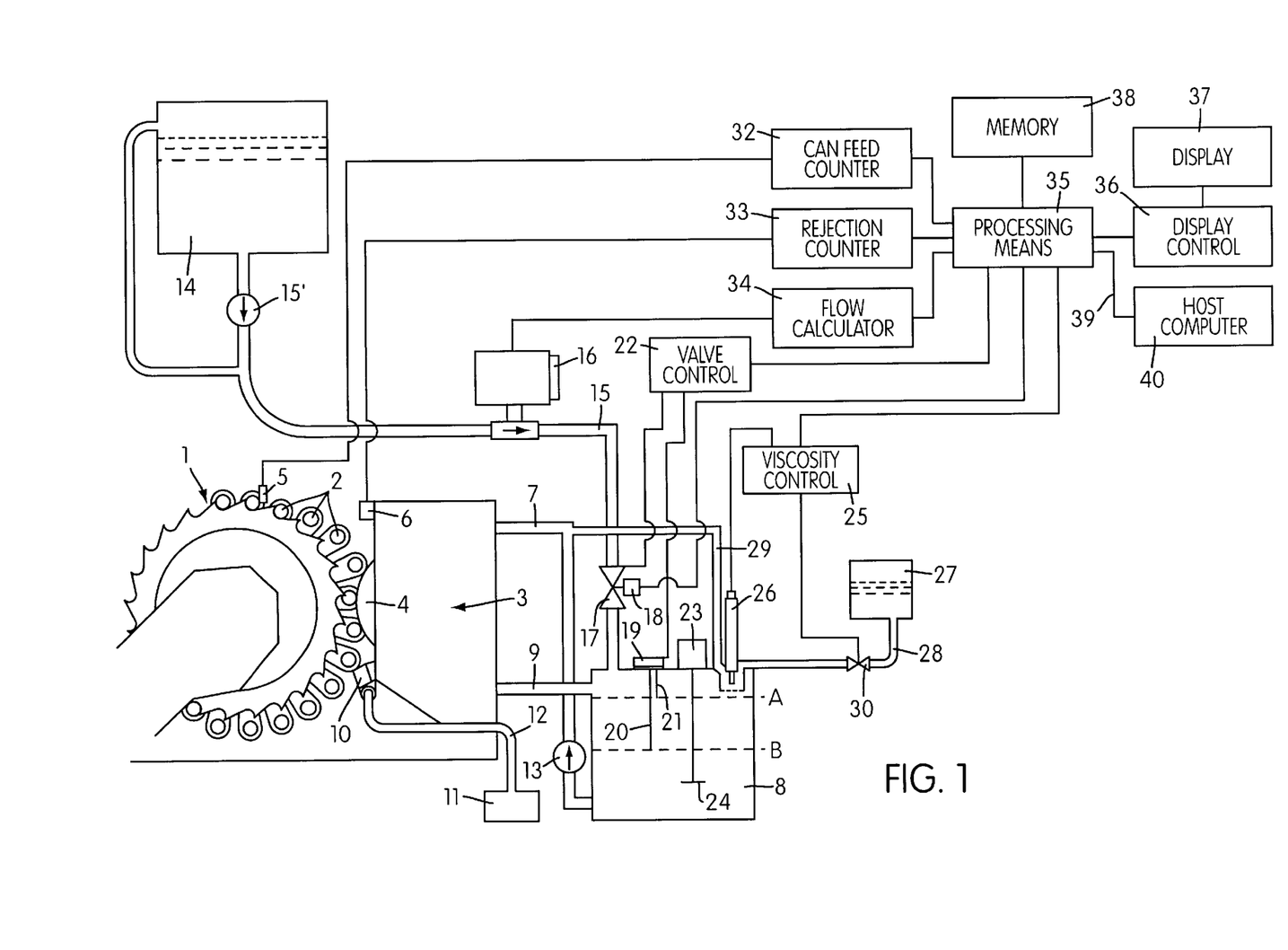
FIG. 1 is a schematic illustration of a monitoring device according to the invention, the device being installed at the application unit of a conventional can production apparatus.

FIG. 1 schematically illustrates relevant parts of a can production apparatus incorporating a monitoring device according to the invention. The can production apparatus has a feed mechanism 1 for continuously feeding cans 2 to an application unit 3. The feed mechanism 1 is arranged to engage the cans 2 with a rotating applicator roller 4 of the application unit 3, so that lacquer is transferred to the outer periphery of the cans 2. A can feed sensor 5 is arranged adjacent the feed mechanism 1 for indicating a can 2 being fed to the application unit 3. To avoid contact between the applicator roller 4 and any defect can fed thereto, the application unit 3 is retractable with respect to the feed mechanism 1 by means of a retraction unit (not shown) when a separate sensor (not shown) indicates such a defect can. A retraction sensor 6 is arranged at the application unit 3 for indicating a retraction of the unit.

A top portion of the application unit 3 is via a supply pipe 7 connected to a bottom portion of a tank 8 for intermediate storage of lacquer. A return pipe 9 connects a bottom portion of the application unit 3 with a top portion of the tank 8. A tray 10 is arranged below the application roller 4 to collect surplus lacquer. The tray 10 is communicated to a collecting vessel 11 via a pipe 12. Alternatively, not shown in FIG. 1, said pipe 12 could be arranged to lead surplus lacquer back to the tank 8. A pump 13 is arranged in the supply pipe 7 to continuously feed lacquer through the application unit 3 and back to the tank 8 via the return pipe 9.

The intermediate storage tank 8 is connected to a lacquer reservoir 14 by means of an inlet pipe 15. A pump 15' is arranged in the inlet pipe 15 to pump lacquer from the reservoir 14 to the tank 8. A flow meter 16 is arranged to measure the flow of lacquer through the inlet pipe 15. An inlet valve 17 arranged in the inlet pipe 15 has an open position in which lacquer is admitted into the tank 8, and a closed position in which the flow of lacquer is shut off. A valve sensor 18 is arranged to indicate the position of the valve 17. Preferably, the valve sensor 18 is adapted to indicate at least the closed position, wherein the valve 17 leaving the closed position indirectly indicates the open position. In this case, the valve sensor 18 will output a first signal level (high/low) in the closed position of the valve 17, and a second signal level (low/high) as soon as the valve 17 has left the closed position, the valve 17 then being in an open position.

The tank 8 has a level gauge 19 comprising first and second elements 20, 21 indicating when the lacquer level in the tank reaches upper and lower levels A and B, respectively, as indicated with dashed lines in FIG. 1. A valve control unit 22 is electrically connected to the inlet valve 17 and the level gauge 19. The control unit 22 is arranged to open the valve 17 when the level gauge indicates a lower level B, and close the valve 17 when the level gauge indicates an upper level A in the tank 8. By operation of the valve control unit 22, the tank 8 will thus be intermittently filled with lacquer to level A.

The tank 8 further comprises stirring means 23 extending into the tank and having a mixing element 24, e.g. vanes or the like, arranged below the lowest possible lacquer level B in the tank 8. The stirring means 23 is used to thoroughly mix the entering diluent with the lacquer in the tank 8. Further, a uniform temperature of the lacquer in the tank 8 can be ascertained. Temperature variations are undesired since they yield corresponding variations in viscosity. Fresh lacquer entering through supply pipe 15 is generally colder than the remaining lacquer in the tank 8, and lacquer recycled through return pipe 9 is generally warmer than the remaining lacquer. Preferably, the mixing element 24 is continuously rotated in the tank 8.

A viscosity control unit 25 is connected to the tank to continuously measure and control the viscosity of the lacquer in the tank 8. The viscosity control unit 25 is connected to a viscosity sensor 26 extending into the tank 8. A tank 27 containing a diluent, e.g. butyl glucol, is connected to the storage tank 8 via a diluent feed pipe 28, and a draw-off pipe 29 connects the supply pipe 7 to the tank 8. Based on the viscosity measured by the sensor 26, the control unit 25 controls the lacquer viscosity by selectively operating a control valve 30 in the pipe 28 to admit diluent into the viscosity sensor 26, where it mixes with lacquer from the draw-off pipe 29 before entering the tank 8.

A can feed counter 32 is electrically connected to the can feed sensor 5 to receive pulses therefrom and count the number of cans 2 fed to the application unit 3. Similarly, a rejection counter 33 is electrically connected to retraction sensor 6 to receive pulses therefrom and count the number of rejected cans 2 in the application unit 3. A flow calculator 34 is electrically connected to the flow meter 16 to calculate the amount of lacquer passing through the flow meter 16.

A processing means 35 is electrically connected to communicate with can feed counter 32, rejection counter 33 and flow calculator 34. Further, the processing means 35 is electrically connected to valve sensor 18 and viscosity control unit 25. A display control unit 36 is electrically connected to the processing means 35 to control the presentation of data on an associated display 37. A memory 38 is electrically connected to the processing means 35 to provide an input data bank. The processing means 35 can also, via a network connection 39, communicate with a host computer 40.

In brief, the monitoring device of FIG. 1 operates in the following way. Lacquer is continuously circulated between the tank 8 and the application unit 3 through the supply and return pipes 7, 9. When the valve 17 is closed, the lacquer surface in the tank 8 will descend. At level B, the valve 17 will be opened to admit lacquer into the tank 8 and the lacquer surface in the tank 8 will ascend. At level A, the valve 17 will be closed, and so on.

Both the amount of lacquer entering the tank 8 and the number of coated cans are measured within a time period in which the lacquer surface in the tank 8 moves from level A to level B and back to level A. Based on the measured quantities, an average lacquer consumption value per can for this time period is calculated. Alternatively, this time period is defined by the lacquer surface moving from level B to level A and back to level B.

A preferred feature of the above arrangement is the provision of a flow meter 16. The flow meter 16 can be used to measure the lacquer entering the tank 8 during a filling sequence with high accuracy.

Another preferred feature is that the calculation of coated cans is triggered by a movement of the valve 17 with respect to a well-defined valve position. This will improve the accuracy of the calculated lacquer consumption value per can.

A further preferred feature is that the calculation of a lacquer consumption value per can is made over a time period between two subsequent movements of the lacquer surface to one and only one of the levels A, B. Thereby, the consumption of lacquer can be monitored at all times during operation of the application unit 3, and there are no blank, i.e. non-monitored, periods between successively calculated values. Further, surface irregularities affecting the accuracy of the calculated value will emerge as variations in the total amount of lacquer entering the tank 8 during a filling sequence from level B to level A. Thus, the accuracy of the calculated value can be assessed.

In addition, the combination of the above features is believed to yield a low sensitivity to surface irregularities.

Below, certain elements of the disclosed embodiment of an inventive monitoring device will be described more in detail.

Preferably, the flow meter 16 should provide fast response times and high accuracy of the measured quantity. In one working embodiment, the flow meter 16 is of a magnetic-inductive type (e.g. "promag 33" supplied by Endress+ Hauser Inc.). In this type of flow meter, the passing medium must have a minimum conductivity of 5 $\mu$S/cm, which is fulfilled for the present types of lacquer. The output signal of the flow meter 16 can be provided in the form of an analog voltage or current proportional to the flow rate. To achieve a high accuracy, however, the flow meter 16 is operated in a "pulse mode" in which the flow meter 16 is set to output pulses at a rate proportional to the measured flow rate. The number of pulses emitted by the flow meter within a given time interval can be converted into volume of lacquer. For this conversion, a calibration value, indicating lacquer volume per pulse, must be supplied.

Preferably, the storage tank 8 should be designed with such a small lacquer surface area that the lacquer contained in the tank 8 can be adequately mixed by a single, small mixing element 24. In one working embodiment, the tank 8 has an interior surface area of 19 dm$^2$, and a total volume of 80 liter, wherein the volume defined between levels A and B preferably is 13–18 liter. Then, in a can production apparatus with a can feed rate of about 1,500 cans per minute, the storage tank 8 can be refilled between levels B and A within 20–30 seconds, using a flow rate yielding reasonable accuracy for the above flow meter 16.

The inlet valve 17 is preferably arranged not more than 30–50 cm above the tank 8, to avoid excessive differences between the actual upper level of lacquer and the level A identified by the second element 21.

The viscosity control unit 25 is a commercially available device, e.g. "Universal Control" supplied by Opticolor. This unit 25 can be externally provided with reference and boundary values of the settling time for the viscosity control. Preferably, this unit 25 is a self-supportive unit that measures and controls the viscosity, and issues an alarm signal to the processing means 35 via a serial interface (RS232) when the boundary values are exceeded. Alternatively, viscosity data could be intermittently communicated from the viscosity control unit 25 to the processing means 35 over the serial interface.

In one working embodiment of the present invention, can feed counter 32, rejection counter 33 and flow calculator 34 are separate 32-bit units of a digital I/O box, which communicates with a personal computer (PC) via a serial interface (Interbus-S). A computer program stored on a hard disk of the computer performs the necessary operations to derive the lacquer consumption per can, as will be described later with reference to FIGS. 2A–C. The reason for using the I/O box is the well-known fact that computer programs running under Microsoft Windows operative system cannot be used for direct counting of rapid pulses, due to the software interrupt of 0.1 sec. In a can production apparatus with a can feed rate of about 1,500 cans per minute, the average time interval between subsequent pulses from the can feed sensor will be 0.04 seconds. Further, the pulse interval of the flow meter, operating in said "pulse mode", can be as low as 0.05 seconds.

The valve control unit 22 can be designed as a stand-alone unit, preferably a Programmable Logic Controller (PLC). The PLC might be electrically connected to the processing unit, to receive a start/stop signal initiating/terminating the sequence of repeatedly filling the tank with lacquer.

Figure 2A:
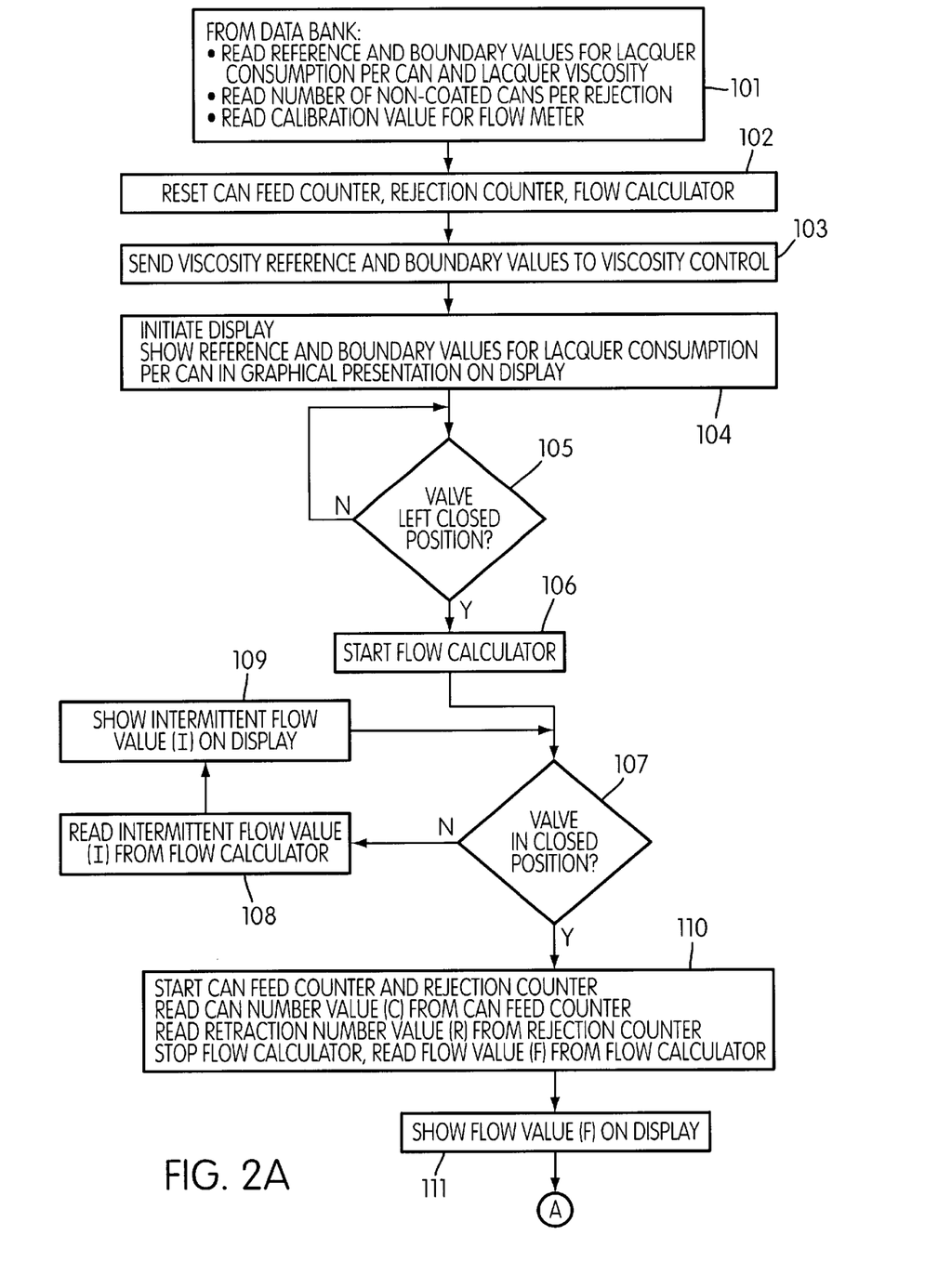
FIG. 2A is a flow chart of a first introductory part of a routine executed by the processing means within the monitoring device according to the invention.
Figure 2B:
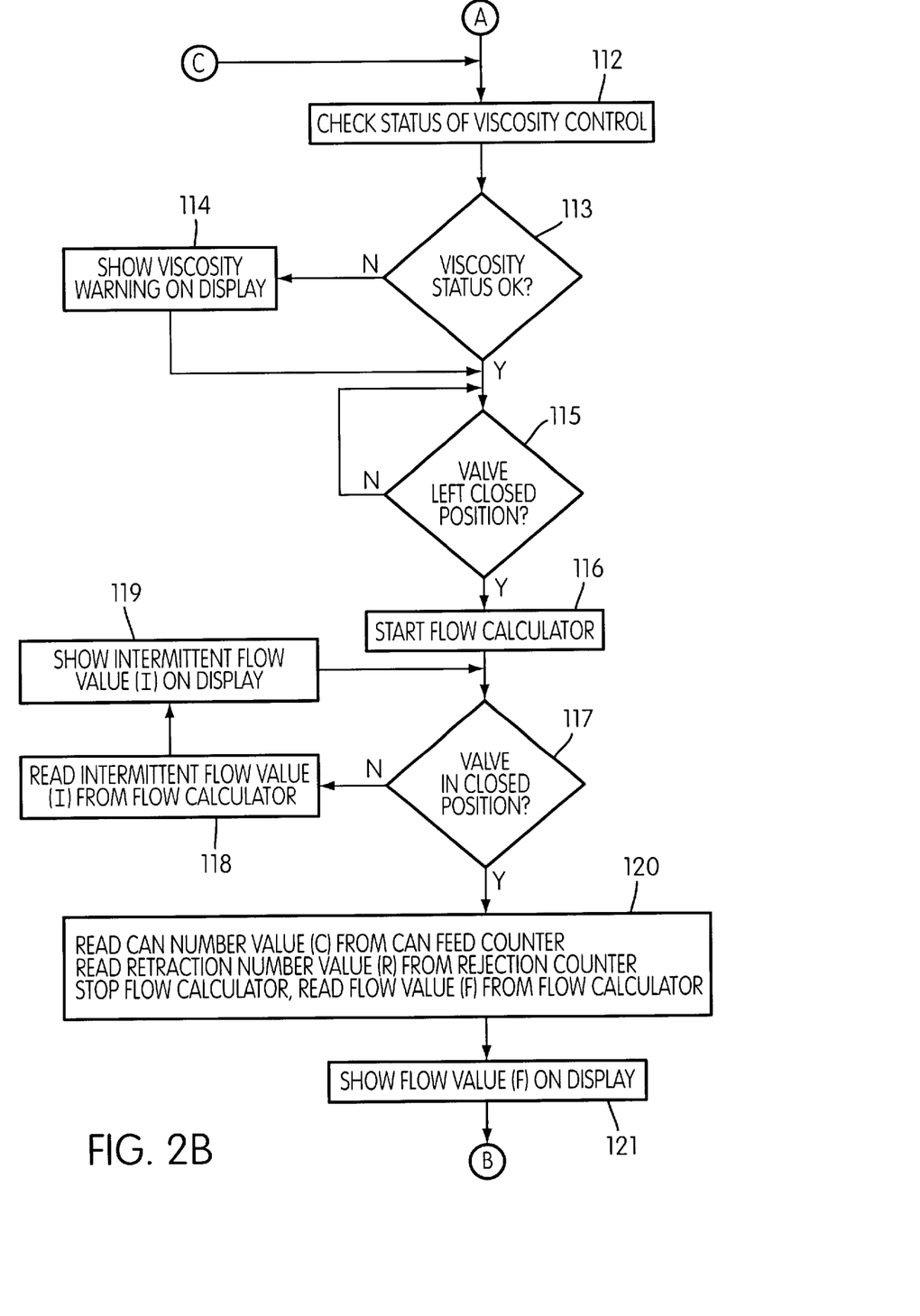
FIG. 2B is a flow chart of a second part of the routine executed by the processing means.
Figure 2C:
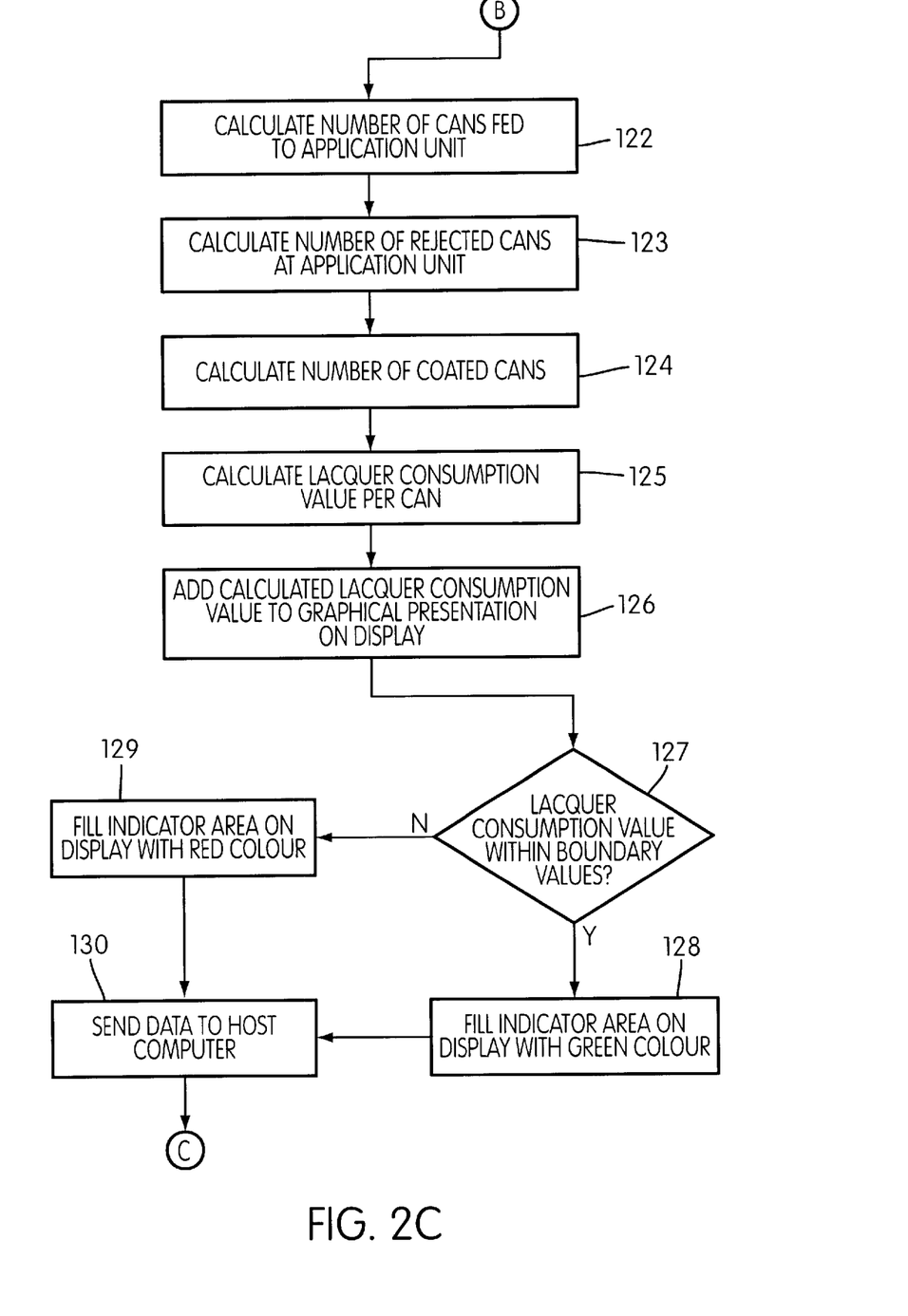
FIG. 2C is a flow chart of a third part of the routine executed by the processing means.

FIGS. 2A–2C illustrate the main program routine that is stored in and executed by a personal computer in a preferred embodiment of the invention. Thus, the personal computer embodies the processing means 35, the display control 36, the display 37, and the memory 38 of FIG. 1. In some cases, it is conceivable that the computer additionally embodies at least one of the valve control unit 22, the can feed counter 32, the rejection counter 33, and the flow calculator 34 of FIG. 1.

Referring to FIG. 2A, the main routine comprises a first sequence of steps 101–111 for initiating the monitoring device. At step 101, data is loaded into the primary memory of the computer from a data bank, which is stored on the computer hard disk 38, i.e. memory 38, or on a separate host computer 40. The data bank typically comprises said reference and boundary values for the lacquer consumption per can and for the viscosity control. Further, the data bank could comprise said calibration value for the flow meter 16, a specific gravity value of the lacquer, and a scaling factor denoting the number of non-coated cans per retraction of the application unit 3. It is conceivable that said values are selected from a list based on the type of lacquer and/or can, as entered by the operator via a keyboard device (not shown) connected to the computer. At step 102, signals are sent to can feed counter 32, rejection counter 33, and flow calculator 34 to reset these devices. At step 103, the viscosity reference and boundary values are sent to the viscosity control unit 25. At step 104, the display control unit 36 is actuated to initiate the display 37, whereby a graphical presentation is shown on the display, the ordinate denoting lacquer consumption per can and the abscissa denoting number of measurements. Preferably, the reference and boundary values for lacquer consumption are shown as horizontal lines on the display, as will be discussed more in detail later with reference to FIG. 3.

At step 105, the processing means waits until the valve sensor 18 identifies a movement of the valve 17 from its closed position. The program then continues to step 106, in which the flow calculator 34 is actuated to start counting the number of pulses from the flow meter 16. Then, at step 107, the processing means 35 checks via the valve sensor 18 if the valve 17 has returned to its closed position, i.e. if the flow of lacquer into the tank 8 is shut off. If not, an intermittent flow value (I) is read from the flow calculator and, via said calibration value, converted to an amount of lacquer. This amount is shown numerically on the display 37 (step 109). The loop of steps 107–109 is repeated until the valve 17 has returned to its closed position. The n, at step 110, the can feed counter 32 and the rejection counter 33 are actuated to start counting the number of cans 2 fed to the application unit 3, and the number of retractions of the application unit 3, respectively. At this instant, the processing means 35 reads a can number value (C) from can feed counter 32, and a retraction number value (R) from rejection counter 33. Then, preferably after waiting a delay time of 5–10 seconds to allow the lacquer left in the inlet pipe 15 below the valve 17 to flow into the tank 8, the flow calculator 34 is stopped and a flow value (F) is read from the flow calculator 34 and converted to a lacquer amount. This lacquer amount, which is the total amount of lacquer that has entered the tank 8, is then numerically shown on the display 37 (step 111).

After this initiation sequence, a main loop 112–130 is entered. A first part of this main loop is shown in FIG. 2B. At step 112, the processing means 35 checks the status of the viscosity control unit 25. If the boundary values of the viscosity control are exceeded, the viscosity control unit 25 issues an alarm signal. If the processing means 35 receives said alarm signal (step 113), a viscosity warning is shown on the display 37 (step 114). Alternatively, steps 112–114 could be omitted, and a viscosity check could be initiated periodically, e.g. every 4 seconds, independently of the main loop.

The program then continues to step 115, in which the processing means 35 waits until the valve sensor 18 identifies a movement of the valve 17 from its closed position, i.e. when lacquer is admitted into the tank 8. At this instant, the processing means 35 starts the flow calculator 34 (step 116).

After step 116, the processing means 35 checks via the valve sensor 18 if the valve 17 has returned to its closed position, i.e. if the flow of lacquer into the tank 8 is shut off (step 117). If not, an intermittent flow value (I) is read from the flow calculator 34 and, via said calibration value, converted to an amount of lacquer (step 118). This amount is shown numerically on the display 37 (step 119). The loop of steps 117–119 is repeated until the valve 17 has returned to its closed position.

Then, step 120 is executed in that the processing means 35 reads a can number value (C) from can feed counter 32 and a retraction number value (R) from rejection counter 33. Preferably after a delay time, the processing means 35 stops the flow calculator 34 and reads a flow value (F) therefrom. This flow value (F) is converted to a lacquer amount. This lacquer amount, which is the total amount of lacquer that has entered the tank 8 between steps 115–120, is then numerically shown on the display 37 (step 121).

In FIG. 2C, a second part of the main loop 112–130 is shown. At steps 122–124, the processing means 35 calculates the number of cans being applied with lacquer during the time period between two subsequent movements of the valve from its closed position. First, at step 122, the number of cans that are fed to the application unit 3 during this time period is calculated as the difference between two subsequently read can number values (C). Second, at step 123, the number of cans that are rejected at the application unit 3 during this time period is calculated as the difference between two subsequently read retraction number values (R) multiplied by said scaling factor. The difference between the quantities calculated at steps 122 and 123, respectively, is the number of cans that are applied with lacquer during this time period (step 124).

At step 125, a lacquer consumption value per can is calculated by dividing the lacquer amount derived at step 120 with the number of cans derived at step 124. Preferably, the lacquer amount (in liter) is first converted to weight (in milligram) by multiplication with the specific gravity value derived at step 101. At step 126, this lacquer consumption is added to the graphical presentation on the display 37. Then, the processing means 35 compares the lacquer consumption value with the corresponding boundary values (step 127). If this value lies within the boundary values, an indicator area on the display 37 is filled with a green colour (step 128). If not, this indicator area is filled with a red colour (step 129). At subsequent step 130, relevant data such as the lacquer consumption value per can is sent to a host computer 40 for storage. After step 130, the program returns to step 112 for another pass of the main loop 112–130.

Figure 3:
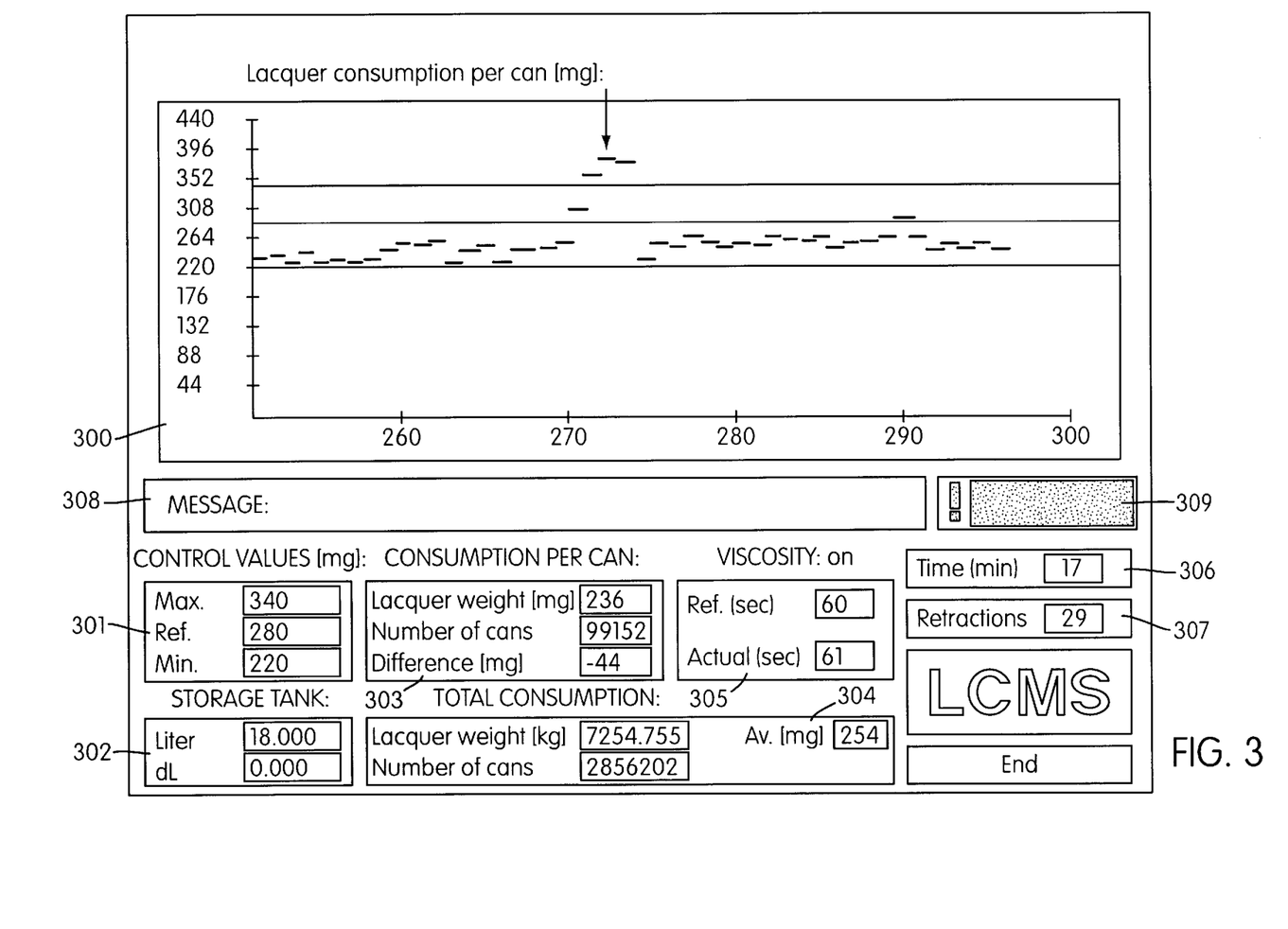
FIG. 3 illustrates the presentation of measurement data on a display during operation of the inventive device.

FIG. 3 is an example of a user interface on a computer display of an operating monitoring device according to the invention. The display has an upper field 300, in which successively calculated lacquer consumption values are graphically presented as successive dashes, allowing the operator to identify unwanted trends in the consumption and take corrective measures. In the example of FIG. 3, an arrow indicates when the operator took such measures.

Preferably, the colour of each dash is used to indicate the current measurement status. A white dash is used when no alarm signal has been issued in the system. A yellow dash indicates a failure in the viscosity control. A blue dash indicates a failure in the flow meter 16, e.g. air in the inlet pipe 15. Finally, a red dash indicates that the current lacquer consumption value per can lies outside the graphical chart as defined in field 300.

The lower portion of the display contains fields 301–307 for numerical presentation of relevant data. Field 301 contains the reference (Ref.) and boundary (Max., Min.) values for the lacquer consumption value per can. These reference and boundary values are also shown in field 300 as horizontal lines. In field 302, the amount (I) of lacquer entering the storage tank 8 is intermittently updated. After a filling sequence, the final amount (F) of lacquer entering the storage tank 8 is presented in this field 302. Preferably, field 302 also displays the difference (dL) between the total amount of lacquer entering the tank 8 in two subsequent filling sequences. This will give the operator an indication of the accuracy of the calculated lacquer consumption value per can.

Field 303 contains the most recently calculated lacquer consumption value per can, as well as the corresponding number of coated cans. In field 304, data is shown on the total consumption of lacquer and cans from the initiation of the monitoring device. Field 305 shows the reference value and the present value of the settling time for the viscosity control unit 25. Field 306 shows the time elapsed since the latest update of the lacquer consumption value on the display. Field 307 shows the retraction value (R). In field 308, error messages are displayed in plain language. The indicator area, the colour of which is changed from green to red when the lacquer consumption value per can falls outside the corresponding boundary values (steps 127–129 in FIG. 2C), is located in field 309.

According to step 114 in FIG. 2B, a viscosity warning is presented to the operator when a failure in the viscosity control is detected. As noted above, this warning is preferably shown as a visual change, e.g. a change in colour or form, of a corresponding dash in field 300. It is also conceivable to initiate an audible alarm signal either when the lacquer consumption falls outside the boundary values, or when there is a failure in the viscosity control. Alternatively, a control signal might be output by the processing means 35 to shut down the can production apparatus.

It should be appreciated that the above description relates to a preferred embodiment of the invention and that modifications are conceivable within the scope of the appended claims. In a variant, the measurements are effected during a time period in which the lacquer surface moves from lower level B to upper level A and back to lower level B in FIG. 1.

In another variant, the level gauge has only a first element indicating the lower level B in the tank 8. As before, when the lacquer surface reaches level B, the valve 17 will be opened to admit lacquer into the tank 8 and the lacquer surface in the tank 8 will ascend. In this variant, however, a predetermined amount of lacquer is admitted into the tank 8, as measured by the flow meter 16. When the processing means 35 registers that the predetermined amount has passed the flow meter 16, it will close the valve 17. The lacquer surface will again be at an upper level in the tank. After the valve 17 is closed, the surface in the tank 8 will gradually descend to level B, where the valve 17 is opened, and so on. Both the amount of lacquer entering the tank 8 and the number of coated cans are measured within a time period in which the lacquer surface in the tank 8 ascends from level B and then descends back to level B.

Clearly, it is not necessary to physically start and stop the flow calculator 34 at the beginning and end, respectively, of said time period. Instead, first and second flow values can be read from the flow calculator 34 by the processing means 35 at the beginning and end, respectively, of said time period. The difference between these flow values equals the total amount of lacquer entering the tank 8 during a filling sequence.

In one alternative embodiment (not shown), the can feed sensor 5 and the retraction sensor 6 are embodied in one and the same sensor, which is arranged adjacent the feed mechanism 1 to indicate the passing of a can 2. This sensor is connected to a sensor control unit, which is adapted to output a first signal each time a non-defect can 2 is fed to the application unit 3, and a second signal when a defect can is fed thereto. Preferably, the sensor is arranged such that no indication is given when a defect can passes the sensor. The sensor control unit is adapted to analyse the sequence of pulses from the sensor, to identify a defect can as an unexpectedly missing pulse in the sequence of pulses, and output the second signal accordingly. The second signal is fed both to the retraction unit for initiation of a retraction of the application unit 3 and to the rejection counter 33 for indication of such a retraction.

Provided that the number of retractions is known to be sufficiently low and constant over time, the output from the can feed sensor 5 can be used to approximate the number of cans 2 being applied with lacquer in the application unit 3. Under these circumstances, the retraction sensor 6 and the rejection counter 32 can be omitted without jeopardising the accuracy of the measurement.

Generally, the inventive method allows a fluid application unit to be operated close to the minimum limit of the amount of fluid per item, thereby saving fluid and reducing operating costs. In particular, by using the inventive device, the operator can adjust the lacquer quantity to a specific amount of lacquer per can. If the cans should have a so-called "open decor", i.e. if the white base-coat should be visible through the graphical print added to the can in the printing unit, the application unit should be operated to an optimum value between the minimum and maximum limits. On the other hand, if the cans should have a so-called "closed decor", i.e. if the graphical print should cover the complete can, the application unit can be operated close to the minimum allowable limit. Thus, considerable savings in lacquer can be achieved.

It should further be noted that each lacquer consumption value per can is calculated as an average of a certain number of cans. Typically, in the preferred embodiment each calculated value is based on 50,000–100,000 cans. Can manufacturers strive to reduce production costs. An increase of the can production rate will automatically yield a faster update of the calculated lacquer consumption value on the display 37 of the inventive device. A reduction in the amount of lacquer per can might call for a corresponding reduction in the filling volume of the tank 8, e.g. by moving the level sensors to a smaller mutual distance A–B, to avoid slow update of flow consumption values on the display 37.

The inventive device can also be used to monitor lacquer consumption at a cupper press in a can production apparatus. However, the invention is not limited to use in a can production apparatus, but is applicable to other situations requiring continuous monitoring of the fluid consumption at high accuracy, especially when the fluid is comparatively expensive.

What I claim and desire to secure by Letters Patent is:

1. A method for monitoring the amount of fluid being applied to cans in an application unit, said unit being connected to a fluid reservoir via an intermediate storage tank, said tank having an inlet pipe connected to said reservoir and an outlet pipe connected to said application unit, valve means being arranged in said inlet pipe for movement between a closed position and an open position, said method comprising the steps of:

intermittently moving said valve means from said closed to said open position, thereby admitting said fluid into said tank and raising a fluid surface therein from a lower level to an upper level;

measuring an amount of said fluid entering said tank by means of a flow meter arranged in connection with said inlet pipe;

counting a number of cans being applied with said fluid in said application unit;

calculating a first value indicating the total amount of said fluid passing said flow meter during a time period between two subsequent movements of said fluid surface to one and only one of said levels;

calculating a second value indicating the total number of cans being applied with said fluid during said time period; and calculating a fluid consumption value per can by dividing said first value with said second value.

2. A method as claimed in claim 1, wherein said one and only one level is said lower level.

3. A method as claimed in claim 1, wherein said one and only one level is said upper level.

4. A method as claimed in claim 1, further comprising the step of controlling said valve means to open based on a level signal from a level sensor associated with said tank.

5. A method as claimed in claim 1, further comprising the step of controlling said valve means to close based on a level signal from a level sensor associated with said tank.

6. A method as claimed in claim 1, further comprising the step of controlling said valve means to close when a predetermined amount of said fluid has passed said flow meter.

7. A method as claimed in claim 1, further comprising the steps of calculating a difference between two successively calculated first values, and sending said difference to a display means for presentation.

8. A method as claimed in claim 1, further comprising the step of sending said fluid consumption value per can to a host computer for storage.

9. A method as claimed in claim 1, further comprising the steps of sensing the position of said valve means, and defining said upper and lower levels based on a movement of said valve means to said closed and open positions, respectively.

10. A method as claimed in claim 9, further comprising the step of waiting a delay time, preferably 5–10 seconds, after the valve means has reached said closed position before calculating said first value.

11. A method as claimed in claim 9, wherein said fluid being applied to cans is lacquer, wherein counter means is arranged to count the number of cans being applied with said lacquer in said application unit, and flow calculating means is arranged to communicate with said flow meter, said calculating steps comprising the further steps of:

a) waiting for said valve means to close;
  b) when said valve means is closed, reading a first flow quantity from said flow calculating means and reading a first can number from said counter means;
  c) waiting for said valve means to open;
  d) waiting for said valve means to close;
  e) when said valve means is closed, reading a second flow quantity from said flow calculating means, reading a second can number from said counter means, calculating said first value based on a difference between said flow quantities, calculating said second value based on a difference between said can numbers, calculating a lacquer consumption value per can by dividing said first value by said second value, and repeating said steps (c)–(e) using said second flow quantity as said first flow quantity and said second can number as said first can number.

12. A method as claimed in claim 9, wherein said fluid being applied to cans is lacquer, wherein counter means is arranged to count the number of cans being applied with said lacquer in said application unit, and flow calculating means is arranged to communicate with said flow meter, said calculating steps comprising the further steps of:

a) waiting for said valve means to open;
  b) when said valve means opens, reading a first flow quantity from said flow calculating means and reading a first can number from said counter means;
  c) waiting for said valve means to close;
  d) when said valve means is closed, reading a second flow quantity from said flow calculating means;
  e) waiting for said valve means to open;
  f) when said valve means opens, reading a second can number from said counter means, calculating said first value based on a difference between said flow quantities, calculating said second value based on a difference between said can numbers, calculating a lacquer consumption value per can by dividing said first value by said second value, and repeating said steps (c)–(f) using said second flow quantity as said first flow quantity and said second can number as said first can number.

13. A method as claimed in claim 9, wherein said fluid being applied to cans is lacquer, wherein counter means is arranged to count the number of cans being applied with said lacquer in said application unit, and flow calculating means is arranged to communicate with said flow meter, said calculating steps comprising the further steps of:

a) waiting for said valve means to open;
  b) when said valve means opens, reading a first flow quantity from said flow calculating means and reading a first can number from said counter means;
  c) reading a second flow quantity from said flow calculating means, and calculating a difference between said second and first flow quantities;
  d) repeating step (c) until said difference equals a predetermined value;
  e) closing said valve means;
  f) waiting for said valve means to open; and
  g) when said valve means opens, reading a second can number from said counter means, calculating said second value based on a difference between said can numbers, calculating a lacquer consumption value per can by dividing said predetermined value by said second value, and repeating said steps (c)–(g) using said second flow quantity as said first flow quantity and said second can number as said first can number.

14. A method as claimed in claim 1, further comprising the step of sending said fluid consumption value per can to a display means for graphical presentation of a succession of such fluid consumption values.

15. A method as claimed in claim 14, further comprising the step of showing boundary values for said fluid consumption value per can in said graphical presentation.

16. A method as claimed in claim 15, further comprising the step of deriving said boundary values from a data bank based on at least one of the type of can and fluid.

17. A method as claimed in claim 14, further comprising the step of continuously adapting a viscosity of said fluid in said tank to a reference value by means of a viscosity control means in fluid communication with said tank, wherein an alarm signal is generated if said viscosity control means is unsuccessful in controlling said viscosity, said alarm signal being output to said display means as a visual change of an associated fluid consumption value in said graphical presentation.

18. A device for monitoring fluid consumption per can in a fluid application unit, said device comprising:

counter means for counting the number of cans being applied with said fluid in said application unit, thereby providing can number data;
  a tank for intermediate storage of said fluid;
  means for feeding said fluid from a fluid reservoir to said tank through an inlet pipe;
  means for feeding said fluid from said tank to said application unit through an outlet pipe;
  valve means provided in said inlet pipe for movement between a closed position and an open position;
  valve control means being adapted to intermittently move said valve means from said closed to said open position, thereby admitting said fluid into said tank and raising a fluid surface therein from a lower level to an upper level;
  a flow meter arranged in connection with said inlet pipe for measuring a flow rate of said fluid into said tank, thereby providing flow rate data; and
  processing means communicating with said counter means, said valve means, said flow meter;
  wherein said processing means, based on said flow rate data and said can number data, over a time period between two subsequent movements of said valve means to one and only one of said positions, effects a calculation of the total amount of said fluid passing the flow meter during said time period and the total number of fluid applied cans during said time period, to subsequently, by dividing said total amount by said total number, calculate a fluid consumption value per can.

19. A device as claimed in claim 18, wherein said valve means comprises a valve sensor adapted to provide an output signal to said processing means indicating when said valve means is moved to said closed position.

20. A device as claimed in claim 18, wherein said one and only one position is said closed position of said valve means.

21. A device as claimed in claim 18, wherein said one and only one position is said open position of said valve means.

22. A device as claimed in claim 18, further comprising a level sensor, which is associated with said tank to indicate at least said upper level, said valve control means communicating with said level sensor and being adapted to effect movement of said valve means to said closed position when said level sensor indicates said upper level.

23. A device as claimed in claim 18, further comprising a level sensor, which is associated with said tank to indicate at least said lower level, said valve control means communicating with said level sensor and being adapted to effect movement of said valve means to said open position when said level sensor indicates said lower level.

24. A device as claimed in claim 23, said valve control means further communicating with said processing means and being adapted to effect movement of said valve means to said closed position when a predetermined amount of fluid has passed said flow meter.

25. A device as claimed in claim 18, wherein said valve means is arranged downstream of said flow meter and close to said tank.

26. A device as claimed in claim 18, wherein stirring means is arranged in said tank to effect continuous stirring of the fluid in said tank.

27. A device as claimed in claim 18, further comprising display means communicating with said processing means, said processing means being arranged to intermittently output said calculated fluid consumption value per can to said display means for graphical presentation of a succession of such values.

28. A device as claimed in claim 18, wherein said processing means is provided with boundary value s for said fluid consumption value per can, said processing means being adapted to issue at least one of a visual and audible alarm signal when said fluid consumption value per can falls outside said boundary values.

29. A device as claimed in claim 18, further comprising viscosity control means arranged in fluid communication with said tank to continuously monitor and control the viscosity of the fluid therein, said processing means communicating with said viscosity control means and being adapted to issue at least one of a visual and audible alarm signal when said viscosity control means indicates a failure in controlling said viscosity.

30. A device as claimed in claim 18, wherein said processing means comprises a computer-readable medium having stored thereon a computer program effecting said communication with said counter means, said valve means and said flow meter as well as said calculations.

31. In a can production apparatus, a device for monitoring lacquer consumption per can in a lacquer application unit, said device comprising:

counter means for counting the number of cans being applied with said lacquer in said application unit, thereby providing can number data;

a tank for intermediate storage of said lacquer;

means for feeding said lacquer from a lacquer reservoir to said tank through an inlet pipe;

means for feeding said lacquer from said tank to said application unit through an outlet pipe;

valve means provided in said inlet pipe for movement between a closed position and an open position;

valve control means being adapted to intermittently move said valve means from said closed to said open position, thereby admitting said lacquer into said tank and raising a lacquer surface therein from a lower level to an upper level;

a flow meter arranged in connection with said inlet pipe for measuring a flow rate of said lacquer into said tank, thereby providing flow rate data;

processing means communicating with said counter means, said valve means, said flow meter;

wherein said processing means, based on said flow rate data and said can number data, over a time period between two subsequent movements of said valve means to one and only one of said positions, effects a calculation of the total amount of said lacquer passing the flow meter during said time period and the total number of lacquer applied cans during said time period, to subsequently, by dividing said total amount by said total number, calculate a lacquer consumption value per can.

32. A method for monitoring the amount of fluid being applied to items in a fluid application unit, said unit being connected to a fluid reservoir via an intermediate storage tank, said tank having an inlet pipe connected to said reservoir and an outlet pipe connected to said application unit, valve means being arranged in said inlet pipe for movement between a closed position and an open position, said method comprising the steps of:

intermittently moving said valve means from said closed to said open position, thereby admitting said fluid into said tank and raising a fluid surface therein from a lower level to an upper level;

measuring an amount of said fluid entering said tank by means of a flow meter arranged in connection with said inlet pipe;

counting a number of items being applied with said fluid in said application unit;

calculating a first value indicating the total amount of said fluid passing said flow meter during a time period between two subsequent movements of said fluid surface to one and only one of said levels;

calculating a second value indicating the total number of items being applied with said fluid during said time period;

calculating a fluid consumption value per item by dividing said first value with said second value;

sending said fluid consumption value per item to a display means for graphical presentation of a succession of such fluid consumption values; and showing boundary values for said fluid consumption value per item in said graphical presentation.

33. A method as claimed in claim 32, further comprising the step of deriving said boundary values from a data bank based on at least one of the type of item and fluid.

34. A method as claimed in claim 32, further comprising the step of continuously adapting a viscosity of said fluid in said tank to a reference value by means of a viscosity control means in fluid communication with said tank, wherein an alarm signal is generated if said viscosity control means is unsuccessful in controlling said viscosity, said alarm signal being output to said display means as a visual change of an associated fluid consumption value in said graphical presentation.

35. A method for monitoring the amount of lacquer being applied to cans in an application unit, said unit being connected to a lacquer reservoir via an intermediate storage tank, said tank having an inlet pipe connected to said reservoir and an outlet pipe connected to said application unit, valve means being arranged in said inlet pipe for movement between a closed position and an open position, counter means being arranged to count the number of cans being applied with said lacquer in said application unit, and flow calculating means being arranged to communicate with said flow meter, said method comprising the steps of:

intermittently moving said valve means from said closed to said open position, thereby admitting said lacquer into said tank and raising a lacquer surface therein from a lower level to an upper level;

measuring an amount of said lacquer entering said tank by means of a flow meter arranged in connection with said inlet pipe;

counting a number of cans being applied with said lacquer in said application unit;

calculating a first value indicating the total amount of said lacquer passing said flow meter during a time period between two subsequent movements of said lacquer surface to one and only one of said levels;

calculating a second value indicating the total number of cans being applied with said lacquer during said time period;

calculating a lacquer consumption value per can by dividing said first value with said second value; and sensing the position of said valve means, and defining said upper and lower levels based on a movement of said valve means to said closed and open positions, respectively;

and wherein said calculating steps comprising the further steps of:
  a) waiting for said valve means to close;
  b) when said valve means is closed, reading a first flow quantity from said flow calculating means and reading a first can number from said counter means;
  c) waiting for said valve means to open;
  d) waiting for said valve means to close; and
  e) when said valve means is closed, reading a second flow quantity from said flow calculating means, reading a second can number from said counter means, calculating said first value based on a difference between said flow quantities, calculating said second value based on a difference between said can numbers, calculating a lacquer consumption value per can by dividing said first value by said second value, and repeating said steps (c)–(e) using said second flow quantity as said first flow quantity and said second can number as said first can number.

36. A method for monitoring the amount of lacquer being applied to cans in an application unit, said unit being connected to a lacquer reservoir via an intermediate storage tank, said tank having an inlet pipe connected to said reservoir and an outlet pipe connected to said application unit, valve means being arranged in said inlet pipe for movement between a closed position and an open position, counter means being arranged to count the number of cans being applied with said lacquer in said application unit, and flow calculating means being arranged to communicate with said flow meter, said method comprising the steps of:

intermittently moving said valve means from said closed to said open position, thereby admitting said lacquer into said tank and raising a lacquer surface therein from a lower level to an upper level;

measuring an amount of said lacquer entering said tank by means of a flow meter arranged in connection with said inlet pipe;

counting a number of cans being applied with said lacquer in said application unit;

calculating a first value indicating the total amount of said lacquer passing said flow meter during a time period between two subsequent movements of said lacquer surface to one and only one of said levels;

calculating a second value indicating the total number of cans being applied with said lacquer during said time period;

calculating a lacquer consumption value per can by dividing said first value with said second value; and sensing the position of said valve means, and defining said upper and lower levels based on a movement of said valve means to said closed and open positions, respectively;

and wherein said calculating steps comprising the further steps of:
  a) waiting for said valve means to open;
  b) when said valve means opens, reading a first flow quantity from said flow calculating means and reading a first can number from said counter means;
  c) waiting for said valve means to close;
  d) when said valve means is closed, reading a second flow quantity from said flow calculating means;
  e) waiting for said valve means to open; and
  f) when said valve means opens, reading a second can number from said counter means, calculating said first value based on a difference between said flow quantities, calculating said second value based on a difference between said can numbers, calculating a lacquer consumption value per can by dividing said first value by said second value, and repeating said steps (c)–(f) using said second flow quantity as said first flow quantity and said second can number as said first can number.

37. A method for monitoring the amount of lacquer being applied to cans in an application unit, said unit being connected to a lacquer reservoir via an intermediate storage tank, said tank having an inlet pipe connected to said reservoir and an outlet pipe connected to said application unit, valve means being arranged in said inlet pipe for movement between a closed position and an open position, counter means being arranged to count the number of cans being applied with said lacquer in said application unit, and flow calculating means being arranged to communicate with said flow meter, said method comprising the steps of:

intermittently moving said valve means from said closed to said open position, thereby admitting said lacquer into said tank and raising a lacquer surface therein from a lower level to an upper level;

measuring an amount of said lacquer entering said tank by means of a flow meter arranged in connection with said inlet pipe;

counting a number of cans being applied with said lacquer in said application unit;

calculating a first value indicating the total amount of said lacquer passing said flow meter during a time period between two subsequent movements of said lacquer surface to one and only one of said levels;

calculating a second value indicating the total number of cans being applied with said lacquer during said time period;

calculating a lacquer consumption value per can by dividing said first value with said second value; and sensing the position of said valve means, and defining said upper and lower levels based on a movement of said valve means to said closed and open positions, respectively;

and wherein said calculating steps comprising the further steps of:

a) waiting for said valve means to open;
b) when said valve means opens, reading a first flow quantity from said flow calculating means and reading a first can number from said counter means;
c) reading a second flow quantity from said flow calculating means, and calculating a difference between said second and first flow quantities;
d) repeating step (c) until said difference equals a predetermined value;
e) closing said valve means;
f) waiting for said valve means to open; and
g) when said valve means opens, reading a second can number from said counter means, calculating said second value based on a difference between said can numbers, calculating a lacquer consumption value per can by dividing said predetermined value by said second value, and repeating said steps (c)–(g) using said second flow quantity as said first flow quantity and said second can number as said first can number.

38. A device for monitoring the amount of fluid being applied to items in a fluid application unit, said device comprising:
counter means for counting the number of items being applied with said fluid in said application unit, thereby providing item number data;
a tank for intermediate storage of said fluid;
means for feeding said fluid from a lacquer reservoir to said tank through an inlet pipe;
means for feeding said fluid from said tank to said application unit through an outlet pipe;
valve means provided in said inlet pipe for movement between a closed position and an open position;
valve control means being adapted to intermittently move said valve means from said closed to said open position, thereby admitting said fluid into said tank and raising a fluid surface therein from a lower level to an upper level;
a flow meter arranged in connection with said inlet pipe for measuring a flow rate of said fluid into said tank, thereby providing flow rate data; and
processing means communicating with said counter means, said valve means, said flow meter;
wherein said processing means, based on said flow rate data and said item number data, over a time period between two subsequent movements of said valve means to one and only one of said positions, effects a calculation of the total amount of said fluid passing the flow meter during said time period and the total number of lacquer applied items during said time period, to subsequently, by dividing said total amount by said total number, calculate a fluid consumption value per item;
and wherein said processing means is provided with boundary values for said fluid consumption value per item, said processing means being adapted to issue at least one of a visual and audible alarm signal when said fluid consumption value per item falls outside said boundary values.

39. A device for monitoring the amount of fluid being applied to items in a fluid application unit, said device comprising:
counter means for counting the number of items being applied with said fluid in said application unit, thereby providing item number data;
a tank for intermediate storage of said fluid;
means for feeding said fluid from a lacquer reservoir to said tank through an inlet pipe;
means for feeding said fluid from said tank to said application unit through an outlet pipe;
valve means provided in said inlet pipe for movement between a closed position and an open position;
valve control means being adapted to intermittently move said valve means from said closed to said open position, thereby admitting said fluid into said tank and raising a fluid surface therein from a lower level to an upper level;
a flow meter arranged in connection with said inlet pipe for measuring a flow rate of said fluid into said tank, thereby providing flow rate data;
processing means communicating with said counter means, said valve means, said flow meter; and
viscosity control means arranged in fluid communication with said tank to continuously monitor and control the viscosity of the fluid therein, said processing means communicating with said viscosity control means and being adapted to issue at least one of a visual and audible alarm signal when said viscosity control means indicates a failure in controlling said viscosity;
wherein said processing means, based on said flow rate data and said item number data, over a time period between two subsequent movements of said valve means to one and only one of said positions, effects a calculation of the total amount of said fluid passing the flow meter during said time period and the total number of lacquer applied items during said time period, to subsequently, by dividing said total amount by said total number, calculate a fluid consumption value per item.

40. A method for monitoring the amount of fluid being applied to cans in an application unit, said unit being connected to a fluid reservoir via an intermediate storage tank, said tank having an inlet pipe connected to said reservoir and an outlet pipe connected to said application unit, a valve being arranged in said inlet pipe for movement between a closed position and an open position, said method comprising of:
intermittently moving said valve from said closed to said open position, thereby admitting said fluid into said tank and raising a fluid surface therein from a lower level to an upper level;
measuring an amount of said fluid entering said tank with a flow meter arranged in connection with said inlet pipe;
counting a number of cans being applied with said fluid in said application unit;
calculating a first value indicating the total amount of said fluid passing said flow meter during a time period between two subsequent movements of said fluid surface to one and only one of said levels;
calculating a second value indicating the total number of cans being applied with said fluid during said time period; and
calculating a fluid consumption value per can by dividing said first value with said second value.

41. A device for monitoring fluid consumption per can in a fluid application unit, said device comprising:
a counter that counts the number of cans being applied with said fluid in said application unit, thereby providing can number data;
a tank for intermediate storage of said fluid;

a first liquid feeder that feeds said fluid from a fluid reservoir to said tank through an inlet pipe;

a second liquid feeder that feeds said fluid from said tank to said application unit through an outlet pipe;

a valve provided in said inlet pipe that moves between a closed position and an open position;

a valve controller adapted to intermittently move said valve from said closed to said open position, thereby admitting said fluid into said tank and raising a fluid surface therein from a lower level to an upper level;

a flow meter arranged in connection with said inlet pipe for measuring a flow rate of said fluid into said tank, thereby providing flow rate data; and a processor that communicates with said counter, said valve, and said flow meter;

wherein said processor, based on said flow rate data and said can number data, over a time period between two subsequent movements of said valve to one and only one of said positions, effects a calculation of the total amount of said fluid passing the flow meter during said time period and the total number of fluid applied cans during said time period, to subsequently, by dividing said total amount by said total number, calculate a fluid consumption value per can.

* * * * *